United States Patent
Oka et al.

(10) Patent No.: US 6,559,854 B2
(45) Date of Patent: May 6, 2003

(54) IMAGE CREATION DEVICE

(75) Inventors: Masaaki Oka, Kanagawa (JP); Masakazu Suzuoki, Tokyo (JP)

(73) Assignee: Sony Computer Entertainment Inc. (JP)

( * ) Notice: Subject to any disclaimer, the term of this patent is extended or adjusted under 35 U.S.C. 154(b) by 286 days.

(21) Appl. No.: 09/797,534

(22) Filed: Mar. 1, 2001

(65) Prior Publication Data

US 2001/0055027 A1 Dec. 27, 2001

(30) Foreign Application Priority Data

Mar. 3, 2000 (JP) .......................................... 2000-059531
Feb. 27, 2001 (JP) .......................................... 2001-052439

(51) Int. Cl.[7] ............................................... G09G 5/00
(52) U.S. Cl. ............................ 345/582; 345/502; 345/506
(58) Field of Search ................................. 345/582, 583, 345/619, 620, 506, 536, 502

(56) References Cited

U.S. PATENT DOCUMENTS 5,835,096 A * 11/1998 Baldwin ....................... 345/582
6,171,186 B1 * 1/2001 Kurosawa et al. ............ 463/31

OTHER PUBLICATIONS

Masaaki Oka et al., Designing and Programming The Emotion Engine –IEEE Micro, Nov.–Dec., 1999, pp. 20–28.
Masakazu Suzoki et al., A Microprocessor with A 128–Bit CPU, Ten Floating–Point MAC's Four Floating–Point Dividers, and An MPEG–2 Decoder–IEEE Journal of Solid–State Circuits, Nov. 1999, volume 34, No. 11, pp. 1608–1618.

* cited by examiner

Primary Examiner—Matthew Luu
(74) Attorney, Agent, or Firm—Lerner, David, Littenberg, Krumholz & Mentlik, LLP

(57) ABSTRACT

An image creation device includes: a plurality of geometry processing means for creating at least one drawing element list by performing geometry processing to express images, respectively, in parallel, said plurality of geometry processing means having at least one first geometry processing means to perform tyical geometry processing and at least one second geometry processing in cooperation with another geometry processing means; drawing means to perform drawing processing based on said drawing element list; and control means to selectively adopt a first mode which parallelizes said at least one first geometry processing means and said at least one second geometry processing means and a second mode to lead a processing result of said at least one second geometry processing means to an input of said at least one first geometry processing means.

13 Claims, 5 Drawing Sheets

FIG. 6A

Fixed Color

FIG. 6B

Fixed Color
Normal

FIG. 6C

Vertex Color
Normal

IMAGE CREATION DEVICE

BACKGROUND OF THE INVENTION

1. Field of the Invention

The present invention relates to an image creation device such as an entertainment device and, more particularly, to an efficient geometry processing technique when a computer graphics image is created.

1. Description of the Related Art

In computer graphics, an object to be displayed is modeled by a set of polygons. The vertexes of the polygons are expressed by homogeneous coordinates (x, y, z, w). The coordinates are converted according to the aspect coordinates, and the transparent transformation thereto or the like are performed according to a distance. For example, a distant object is converted to become small. The series of processings is called as a "geometry processing". The vertex coordinates obtained as a result of the geometry processing is called as a display list (Display List: image display instruction).

The display list is sent to the drawing processing means. The drawing processing means draws a basic figure according to the display list in a frame memory. The drawing result is converted from a digital signal to an analog signal, and is displayed on a display unit.

Since the drawing result is updated according to a video rate every 1/60seconds, a moving image is displayed on a screen of the display unit. A series of drawing processings by the drawing processing means is called "rendering processing".

Recently, the advancement of the semiconductor technology is remarkable. Since it has become possible to integrate a frame memory and the drawing processing means on an LSI and, therefor, improve the rendering processing, performance of the geometry processing has become relatively insufficient. As means for solving such a disadvantage, it is effective to connect a plurality of geometry engines (means for executing the geometry processing, and so forth) with the drawing processing means in parallel. In the drawing processing, there are a lot of parameters which should be preset, for instance, a clip area and a half transparent processing rate, etc. Thus, it becomes necessary to switch the parameters ("drawing context (Graphic Context)", or simply "context") used in an individual geometry engine.

On the other hand, two processings with different characters may exist together when a detailed breakdown of the geometry processing is observed. One of them is a pure coordinate conversion processing, and another is a behavior calculation processing. The former is a fixed geometry processing, and the latter is an unfixed geometry processing. For example, when a game program is analyzed, calculating a behavior of a character ("character" is not limited to man and may be applied to other objects, such as a motion of an enemy plane in a shooting game or a car in a racing game) in response to an external input, and actually calculating coordinate conversion and performing illumination processing have quite different time schedules, respectively. Although it is suffient when the former calculation is concluded on a video frame unit (1/60seconds) basis, the latter calculation requires synchronization with a rendering pipeline on a polygon drawing unit basis, which is more detailed than the former calculation. Even if both of the calculations are similar, frequent context switching is required to deal with the different time axis in a single processing mode and, therefor, a serious disadvantage in the real time system arises.

Since there are processes that require the coordinate conversion processing while calculating and processes that require the coordinate conversion processing besides the behavior calculation processing as a behavior calculation processing, it is not necessarily simple. Therefore, a mechanism, which can send the result of the behavior calculation processing directly to the drawing processing means or use it for the coordinate conversion again, becomes desirable.

SUMMARY OF THE INVENTION

A main subject of the present invention is to provide an image creation device which can cancel the above-mentioned disadvantage.

To solve the above-mentioned disadvantage, an image creation device according to the present invention is characterized by comprising: a plurality of geometry processing means to create a drawing element list by performing geometry processings to express images, respectively, in parallel, said plurality of geometry processing means having at least one first geometry processing means to perform a typical geometry processing and at least one second geometry processing means to perform an atypical geometry processing with close-coupled and in cooperative with other geometry processing means; drawing means to perform a drawing processing based on said drawing element list; and control means to selectively adopt a first mode which parallelizes said at least one first geometry processing means and said at least one second geometry processing means for a processing of a following step and a second mode to lead a processing result of at least one second geometry processing means to an input of said at least one first geometry processing means.

In a first mode, at least two drawing element lists are created in parallel. In a second mode, a drawing element list, in which the processing result of one geometry processing means is reflected to the processing result of other geometry processing means, is created. Thereby, the result of, for example, an atypical geometry processing (coordinate conversion result) is directly led to the latter step processing in the first mode, and is supplied to the coordinate conversion again in the second mode. The efficiency improvement of the entire geometry processing can be achieved by using both of them property.

The control means has a function to dynamically switch one of the first mode and the second mode to the other one thereof. As the switch reference in this case, for example, there are modes to switch according to the entire amount of the geometry processing executed in the plurality of geometry processing means and to switch according to the change in the target of the geometry processing executed in the plurality of geometry processing means. As a latter example, for example, it may be considered when the processor, which performs the atypical geometry processing, performs the retrieval of the representative point of the image which consists of the set in the plurality of vertex, the first mode is adopted, and is switched to the second mode when the retrieval ends.

Thereby, an efficient processing according to the content of the geometry processing becomes possible.

Such an image processing device can be achieved by the computer single unit, the cooperation of the computer and the program, the cooperation of the computer, and the semiconductor device used thereto.

As is clear from the above-mentioned explanation, according to the present invention, since the result of the atypical geometry processing is directly led to the drawing processing means and can be shifted to the coordinate conversion on the way thereof, the geometry processing, which flexibly corresponds to a atypical element, becomes possible.

Since the efficiency improvement of the geometry processing can be achieved entirely and the context switch also decreases, an image creation device suitable by the real time system can be achieved.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 6A to FIG. 6C are figures which show an example form of a display list.

DESCRIPTION OF THE PREFERRED EMBODIMENT

Hereafter, an embodiment, when an image creation device according to the present invention is applied to an entertainment device which creates computer graphic image for entertainment, will be explained.

The entertainment device according to the embodiment expresses moving images using polygons on the display unit, and outputs sound which corresponds to a movement of the image from the speaker according to a program or data recorded on an exchangeable media, for instance, CD-ROM and DVD-ROM, etc.

Figure 1:
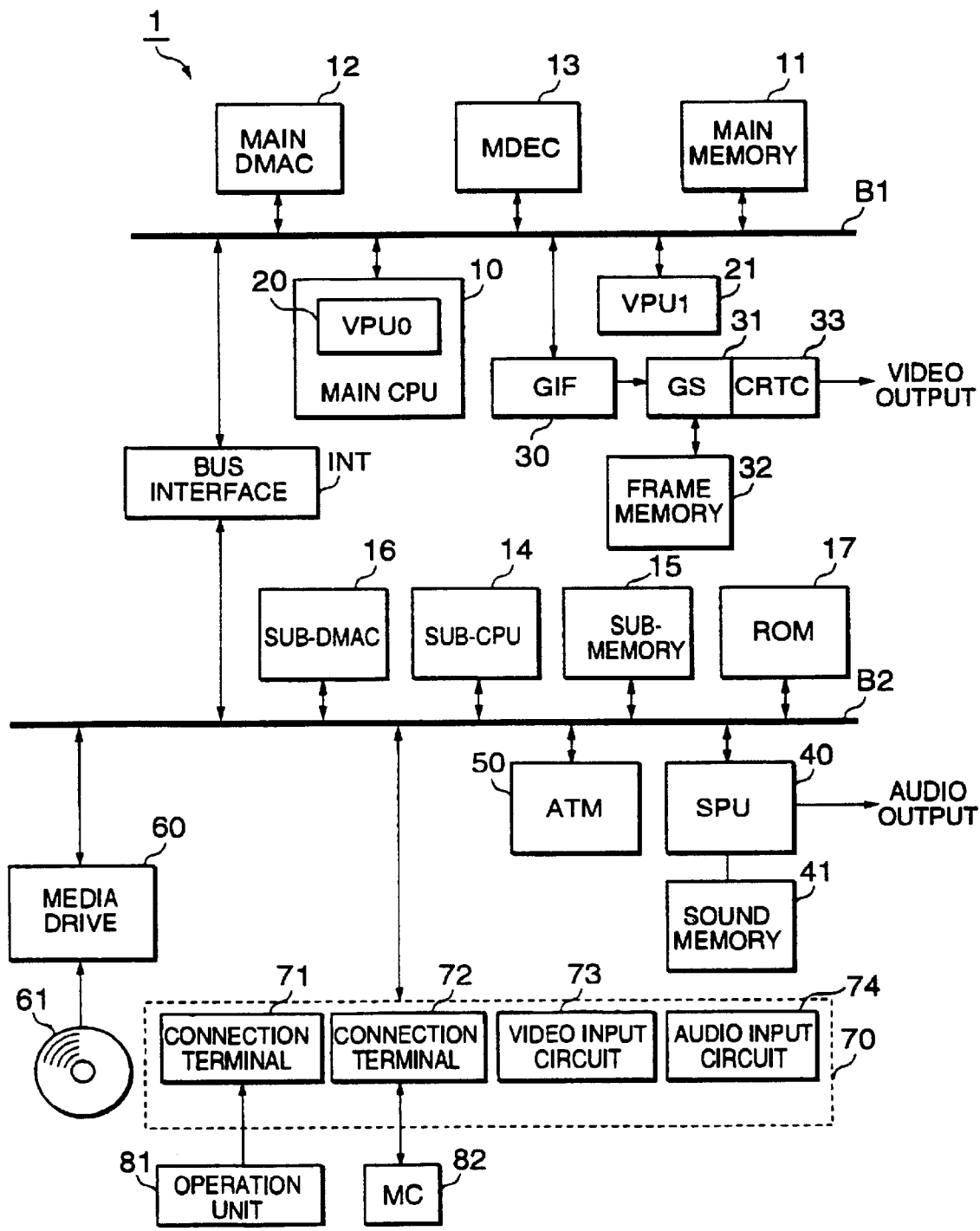
FIG. 1 is an internal configuration figure of the entertainment device which becomes an embodiment of the present invention.

FIG. 1 illustrates an internal configuration of an entertainment device. This entertainment device 1 has two buses, a main bus B1 and a sub-bus B2. The buses B1 and B2 are mutually connected or cut off through a bus interface INT.

A main memory 11 which is constructed by a RAM (random access memory), a main DMAC (direct memory access controller) 12, an MPEG (Moving Picture Experts Group) decoder (MDEC) 13, a second vector processing device (VPU1, which is called a "second VPU", hereinafter) 21, and a GIF (graphical synthesizer interface) 30 which functions as an arbiter of the first VPU 20 and the second VPU 21 are connected with the main bus B1. A drawing processing means 31 (graphical synthesizer, which is called as a "GS", hereinafter) is connected through a GIF 30 to a main CPU (central processing unit) 10. The main CPU 10 is a semiconductor device in which a microprocessor, a first vector processing device 20 (VPU (vector processing unit) 0, which is called "first VPU", hereinafter), etc. are mounted on one semiconductor chip. A CRTC (CRT controller) 33, which creates a video output signal, is connected with the GS 31.

From the viewpoint of miniaturizing the device, an integrated type semiconductor device which integrates part or all functions of the main memory 11, the main DMAC 12, the MPEG decoder 13, the second VPU 21, the GIF 30 and the GS 31 together with the main CPU 10 on one semiconductor chip may be used. When a semiconductor device which integrates only a part of components on the semiconductor chip, this semiconductor device and the remainder components are connected with the main bus B1.

When the entertainment device 1 is started, a main CPU 10 reads a start program from a ROM 17 on the sub-bus B2 through a bus interface INT, and executes the start program to operate an operating system. The main CPU 10 controls a media drive 60 to read an application program and data from a media 61, and stores the data in the main memory 11. In addition, the main CPU 10 performs the geometry processing on three-dimensional object data (coordinate values etc. of the vertex of the polygon (representative point)). The three-dimensional object data may be constructed by various data read from the media 61, for instance, a plurality of basic figures (polygons) in cooperation with the first VPU 20.

In the main CPU 10, a high-speed memory, which is called as a SPR (Scrach Pad RAM) to temporarily hold a cooperative processing result with the first VPU 20, is provided.

The first VPU 20 has a plurality of calculation elements which calculate real floating point numbers in parallel. That is, the main CPU 10 and the first VPU 20 perform calculation processing which requires detailed operations on a polygon unit basis of the geometry processing. Then, the display list is created, which includes polygon definition information of the vertex coordinate series, shading mode information, etc. obtained by this calculation processing.

The polygon definition information includes drawing area setting information and polygon information. The drawing area setting information includes offset coordinates in the frame memory address on the drawing area and coordinates of the drawing clipping area to cancel the drawing when there are coordinates of the polygon at the external device of the drawing area. The polygon information includes polygon attribute information and vertex information. The polygon attribute information specifies a shading mode, an α-blending mode, and a texture mapping mode, etc. The vertex information includes coordinates in the vertex drawing area, the coordinates in the vertex texture area, the vertex color, etc.

The second VPU 21 has the same-configuration as the first VPU 20, i.e., it has a plurality of calculation elements which calculate real floating point numbers in parallel. The second VPU 21 can create an image in response to the operation of the operation device 81 and operating matrix, for example, to create a display list having simple two-dimensional polygon definition information. The two-dimensional polygon definition information can be created using transparent transformation to objects having simple shapes, such as buildings and cars, the parallel light source calculations, and the processing of a two-dimensional curved surface creation etc.

Though the first VPU 20 and the second VPU 21 may have the same configuration, they function as geometry engines to perform the calculation processings on different contents, respectively. Usually, the processing of movement etc. of a character to which a complex behavior calculation is requested (atypical geometry processing) is allocated to the first VPU 20, and processing of an object for which a lot of polygon calculations (although simple calculations) are requested, for instance, processing of a building etc. of the background (typical geometry processing) is allocated to the second VPU 21.

The first VPU 20 performs macro calculation processing in synchronization with a video rate, and the second VPU 21 is operated in sychronization with the GS 31. With this configuration, the second VPU 21 comprises a direct connection to the GS 31. Oppositely, the first VPU 20 is closely coupled with the microprocessor in the main CPU 10 so that complex processing may be readily carried out.

Figure 2:
FIG. 2 is a figure which shows an example of an image created by a calculation processing of a second VPU.
Figure 3:
FIG. 3 is a figure which shows an example of overlapping an image asynchronously created with a first VPU with an image of FIG. 2 by a second VPU when the bus to the GS is unoccupied.

The image created by the calculation processing of the second VPU 21 is shown in FIG. 2, and FIG. 3 shows an example of overlapping the image asynchronously created by the first VPU 20 with the image of FIG. 2 by a second VPU when the bus to the GS is unoccupied.

As described above, a reason why it may be necessary to use two VPUs 20 and 21 is that the usage of this device is specialized to the entertainment multimedia. A disturbance of the save of various registers and the floating point calculation pipeline may arise if it is applied in a general-purpose application.

The display lists created by the first VPU 20 and the second VPU 21 are transferred to the GS 31 through the GIF 30.

The GIF 30 operates as an Arbiter so that the display list created the first VPU 20 and the second VPU 21 do not collide when they are transferred to the GS 31. In this embodiment, a display list having a higher priority is sequentially examined, and the function for transferring them from the upper display list to the GS 31 is added to the GIF 30. The information, which indicates the priority of the display list, may be judged originally in the GIF 30 though it is usually described in the tag area when each of VPUs 20 and 21 creates the display list.

The GS 31 stores the drawing contexts, and reads a drawing context that corresponds with the identification information of the image context included in the display list from the GIF 30. The GS31 performs rendering processing using the drawing context, and draws the polygons in the frame memory 32. Since the frame memory 32 can be used as a texture memory, the pixel image in the frame memory can be put on the polygon to be drawn as a texture.

The main DMAC 12 controls the DMA transfer for each circuit connected with the main bus B1 and controls the DMA transfer for each circuit connected with the sub-bus B2 according to the state of the bus interface INT.

The MDEC 13 operates in parallel with the main CPU 10, and expands the data compressed by the MPEG (Moving Picture Experts Group) method or the JPEG (Joint Photographic Experts Group) method, etc.

A sub-CPU 14 composed of the microprocessor etc., a sub-memory 15 composed of the RAM, a sub-DMAC 16, a ROM 17 on which the program of the operating system etc. are stored, a voice processing device 40 (SPU (sound processing unit)) which reads the sound data accumulated in sound memory 59 and outputs it as an audio output, a communication controller (ATM) 50 to transmit and receive data by the public line etc., a media drive 60 to access the media 61 such as a CD-ROM and a DVD-ROM, and an input part 70 are connected with the sub-bus B2. The input part 70 has a connection terminal 71 to connect the operation device 81, a connection terminal 72 to connect the memory card MC, a video input circuit 73 to receive the input image data from the external device, and an audio input circuit 74 to receive the voice data from the external device.

The sub-CPU 14 performs various operations according to the program stored on the ROM 17. The sub-DMAC controls the DMA transfer etc. for each circuit connected with the sub-bus B2 only in a state that the bus interface INT cuts off the main bus B1 and the sub-bus B2.

The entertainment device 1 of this embodiment processes a characteristic geometry.

The geometry processing, which can be adapted to the high-speed rendering processing can be achieved by operating the first VPU 20 and the second VPU 21 in parallel, becomes possible as mentioned-above. Here, the main CPU 10 dynamically determines (via software) whether to send the calculation processing result from the first VPU 20 to the GIF 30 directly or to send it serially to the second VPU 21.

The former mode is called as a "parallel connection" and the latter mode is called as a "serial connection". The output of the second VPU 21 has a path connected directly to the GIF 30 (GS 31), and performs the coordinate conversion in synchronization with the timing of the rendering processing of the GS 31. Therefore, the GS 31 never enters a superfluous standby state.

Figure 4:
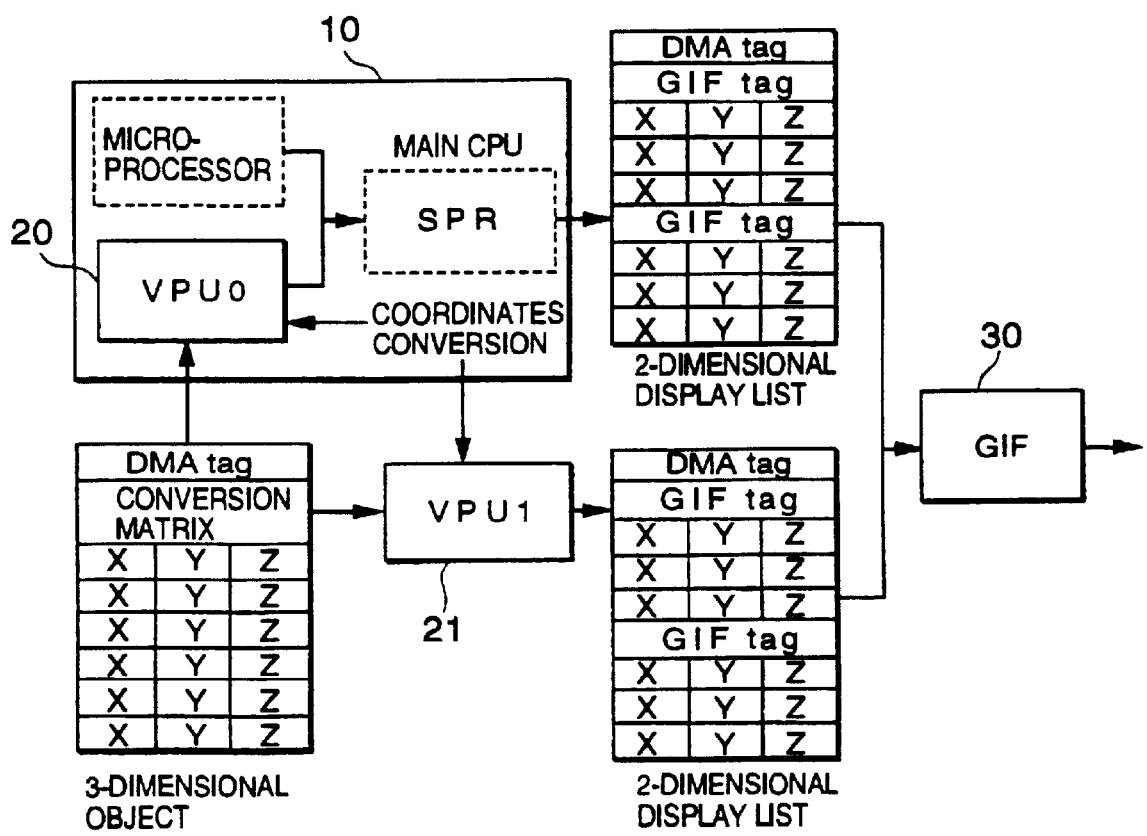
FIG. 4 is an explanation figure of a concept of a geometry processing by a parallel connection according to the embodiment.

FIG. 4 is a figure which shows a creation process of the display list by the parallel connection of the first VPU 20 and the second VPU 21.

The three-dimensional object (X, Y, and Z coordinate series) identified by the "DMAtag" is coordinate-converted by each of the VPUs 20 and 21. The two-dimensional display lists identified by the "DMAtag" and the "GIFtag" are created. These display lists are merged and sent to the GIF 30.

In the parallel connection, the display list is created as a calculation processing result by which the first VPU 20 performs cooperatively with the microprocessor. The display list is held in the SPR and is transferred to the GS 31, through arbitration by the GIF 30, not to collide with the display list created the second VPU 21. The display list created with the microprocessor and the first VPU 20 is coordinate-converted and created by calculating the behavior of the three-dimensional object identified by the "DMAtag".

As an example, the created display list as mentioned above may be used to calculate and to display the movement of a waterdrop flowing on a windshield.

In this case, the coordinate conversion of the three-dimensional waterdrop object is performed by calculating the behavior. The waterdrop, which flows on the windshield, is expressed by a set of polygons and the behavior calculation of each polygon is subject to coordinate conversion processing. The display list of the flowing waterdrop is created by the coordinate conversion by the behavior calculation.

Figure 5:
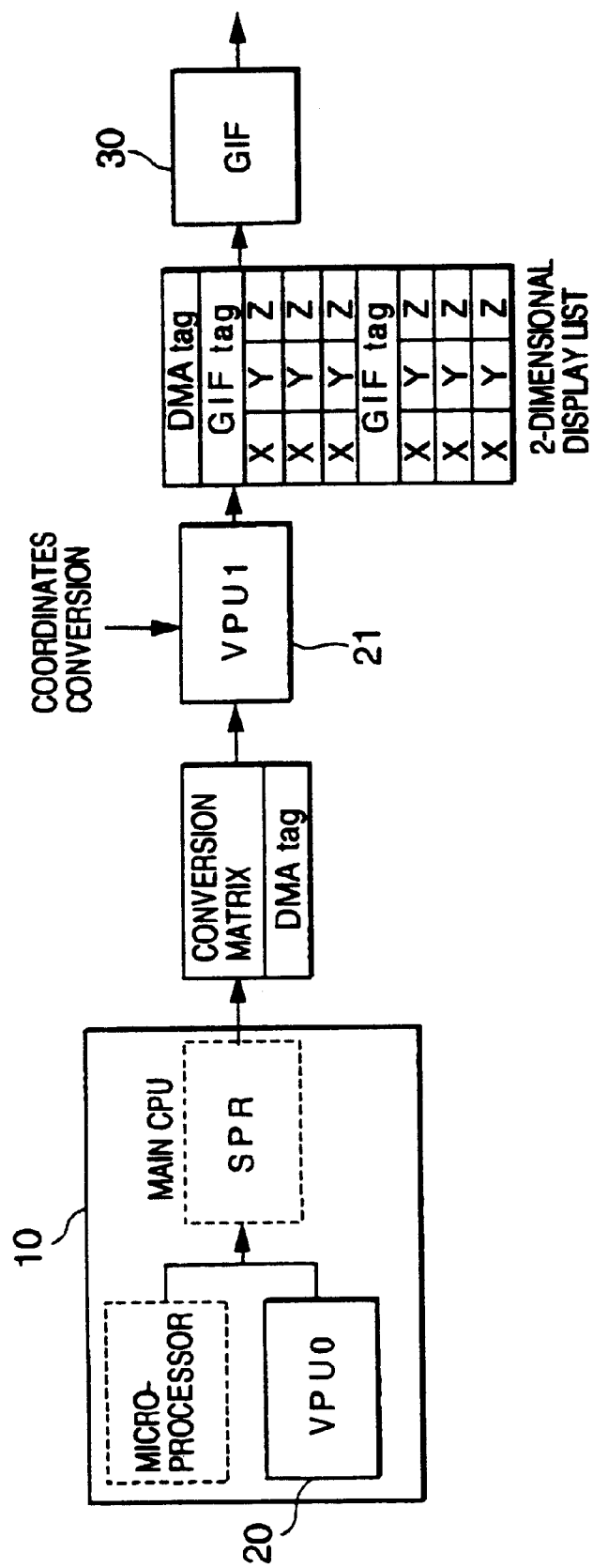
FIG. 5 is an explanation figure of a concept of a geometry processing by a serial connection according to the embodiment.

FIG. 5 shows a creation process of the display list by the serial connection.

In the serial connection, a conversion matrix is created as a calculation processing result of the first VPU 20. This conversion matrix is held in the SPR, and the "DMAtag", which identifies a three-dimensional object which converts coordinates, is added thereto and is transferred the second VPU 21. The second VPU 21 converts coordinates of the three-dimensional object identified by the "DMAtag" by the conversion matrix which is transferred and creates the two-dimensional display list.

As an example, the created display list as mentioned above may be used to calculate and to display the movement of a tire of a car in transit. In this case, before performing the coordinate conversion processing, the behavior of the center coordinates of the tire is calculated. Since the image of the tire is not deformed, the coordinate position where the entire image should be converted is determined by deciding the location of the center coordinates of the tire. That is, the conversion matrix which determines the center coordinates of the tire by the behavior calculation may be created and the coordinate conversion of the three-dimensional object of the tire may be performed by using this conversion matrix.

The behavior calculation of the center coordinates of the tire is calculated by the first VPU 20 from the position and the speed of the body of the car, the coordinates value of the road and the peculiar spring constants, etc. As a result, the conversion matrix, which determines the center coordinates of the tire, is calculated. This conversion matrix is held in the SPR. On the other hand, the three-dimensional object of the tire is stored on the main memory 11. The main CPU 10 transfers the calculated conversion matrix to the main memory 11 and, subsequently, transfers the "DMAtag" to the three-dimensional object of the tire to the main memory 11. The transferred conversion matrix and the "DMAtag" are merged in the main memory 11. The merged conversion matrix and the "DMAtag" are transferred to the second VPU 21. The second VPU 21 performs the coordinate conversion processing of the three-dimensional object identified by the "DMAtag" by using the transferred conversion matrix. As described above, the display list of the tire of the car in transit is created.

FIG. 6A to FIG. 6C are figures which show examples of the display list created by the first VPU 20 and the second VPU 21.

FIG. 6A is a display list for a three-dimensional object in which the color is fixed. The "GIFtag" shows a priority of the display list used by the GIF 30 to perform the arbitration function. A "Size" shows a size of the display list. "R" and "G", "B", and "A" show the colors of the vertexes. "Vx" and "Vy", "Vz", "Vw", and "VerteX" show the vertex coordinates used to construct the three-dimensional object.

FIG. 6B is a display list for a three-dimensional object in which a color of the normal of each vertex and a color of each vertex are changed. "Nx" and "Ny", "Nz", "NW", and "normal" show normal coordinates for each vertex used to construct the three-dimensional object.

FIG. 6C is a display list for a three-dimensional object in which colors for each vertex change. A "color" indicates the color in each vertex.

Thus, in the entertainment device 1 of this embodiment, the first VPU 20 and the second VPU 21 may execute the geometry processing in either of the parallel (parallel connection) mode or the serial (serial connection) mode in accordance with the software for the GIF 30 and the GS 31. These modes are dynamically switched according to the amount of processing or the processing target of the entire geometry processing. Thus, the efficiency improvement of the geometry processing can be achieved. Especially, in the serial connection, the switch of the image context in the previous step of the GS 31 becomes unnecessary and the overhead in the GS 31 is avoided.

Though an example of using two VPUs 20 and 21 is shown as the geometry engine in this embodiment, the number of VPU may be three or more. In this case, the mode of the parallel connection becomes flexible. For example, a mode such that two VPUs are a parallel connection and the output thereof are led to the input stage of the third VPU may be achieved.

A similar processing by using other calculation processing means of the function equal to the VPU can be performed.

In this embodiment, an example where two kinds of geometry engines are achieved by using the main CPU 10 (including the first VPU 20) and the second VPU 21 is shown. The present invention has a principal object that at least one of the plurality of geometry processing means performs a typical geometry processing and at least another geometry processing means performs an atypical geometry processing (with a close-coupled and cooperative relationship with other geometry processing means to at least one second geometry processing means of said plurality of geometry processing means). A program is used to construct control means to enable an execution of the drawing processing on the computer, based on a drawing element list. A plurality of geometry processing means are used to generate a display list by performing a geometry processing to express the images, respectively, in parallel. The control means can selectively adopt a manner in which the at least one geometry processing means (which performs a typical geometry processing) and the other geometry processing means (which proforms a n atypical geometry processing) a re parallelized. The control means can also adopt a manner which leads a result of the at least one geometry processing means (which performs the atypical geometry processing) to an input of the other geometry processing means (which performs the typical geometry processing). Therefore, the embodiment is not limited to the above-mentioned embodiments.

Such a program may be recorded on the ROM 17 with the start program as mentioned above beforehand and may be recorded on the medium 61 such as above-mentioned CD-ROM and DVD-ROM.

The image creation device according to the present invention is not limited to the entertainment device 1 and may be similarly applied to the same kind of image creation mechanism. The image, which becomes the target of the geometry processing, may not be a computer graphics image for the entertainment.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An image creation device comprising:
    a plurality of geometry processing means for creating at least one drawing element list by performing geometry processing to express images, respectively, in parallel, said plurality of geometry processing means having at least one first geometry processing means to perform typical geometry processing and at least one second geometry processing means to perform atypical geometry processing in cooperation with another geometry processing means;

drawing means to perform drawing processing based on said drawing element list; and control means to selectively adopt a first mode which parallelizes said at least one first geometry processing means and said at least one second geometry processing means and a second mode to lead a processing result of said at least one second geometry processing means to an input of said at least one first geometry processing means.

2. The image creation device according to claim 1, wherein said control means dynamically switches between said first mode and said second mode according to an entire amount of geometry processing executed by said plurality of geometry processing means.

3. The image-creation device according to claim 1, wherein said control means dynamically switches between said first mode and said second mode according to a change in a target of geometry processing executed by said plurality of geometry processing means.

4. The image creation device according to claim 3, wherein said control means switches to said first mode when said at least one second geometry processing means retrieves a representative point of an image from a set of of vertexes, and switches to said second mode when said retrieval ends.

5. The image creation device according to claim 1, wherein an image to be expressed by said geometry processing means is a computer graphic image for entertainment purposes.

6. A method of switching geometry processing modes among a plurality of geometry processing means of an image creation device to create a drawing element list by performing geometry processing to express images, respectively, in parallel, said drawing element list being used in performing drawing processing, said method comprising:

allocating a function to perform typical geometry processing to at least one first geometry processing means of said plurality of geometry processing means;

allocating a function to perform atypical geometry processing in cooperation with other geometry processing means to at least one second geometry processing means of said plurality of geometry processing means; and using software to dynamically switch between a first mode which parallelizes said at least one first geometry processing means and said at least one second geometry processing means and a second mode to lead a processing result of said at least one second geometry processing means to an input of said at least one first geometry processing means.

7. A computer readable record medium containing a program to cause a plurality of geometry processing means to create a drawing element list by performing geometry processing to express images, respectively, in parallel, and to cause a control means to perform drawing processing based on said drawing element list on a computer, said program comprising:

computer readable program code means for causing a computer to allocate a function to perform typical geometry processing to at least one first geometry processing means of said plurality of geometry processing means;

computer readable program code means for causing a computer to allocate a function to perform atypical geometry processing in cooperation with other geometry processing means to at least one second geometry processing means of said plurality of geometry processing means; and computer readable program code means for causing a computer to selectively adopt a first mode which parallelizes said at least one first geometry processing means and said at least one second geometry processing means and a second mode to lead a processing result of said at least one second geometry processing means to an input of said at least one first geometry processing means.

8. A semiconductor device to cause a plurality of geometry processing means to create a drawing element list by performing geometry processing to express images, respectively, in parallel, and to cause a control means to perform drawing processing based on said drawing element list on a computer, said semiconductor device comprising:

means for allocating a function to perform typical geometry processing to at least one first geometry processing means of said plurality of geometry processing means; and means for allocating a function to perform atypical geometry processing in cooperation with with other geometry processing means to at least one second geometry processing means of said plurality of geometry processing means, wherein said control means for selectively adopting a first mode which parallelizes said at least one first geometry processing means and said at least one second geometry processing means and a second mode to lead a processing result of said at least one second geometry processing means to an input of said at least one first geometry processing means.

9. An apparatus for processing polygons of image objects to form a moving image, comprising:

at least one first geometry processing unit operable to perform geometry processing on said polygons to form one or more background objects of said moving image;

at least one second geometry processing unit operable to perform geometry processing on said polygons to form one or more moving objects of said moving image;

a controller operable to selectively adopt first and second modes of operation, said first mode of operation obtaining parallel drawing element lists from said first and second geometry processing units such that they may be merged to form a combined drawing element list, and said second mode of operation routing said geometry processing result of said at least one second geometry processing unit to said at least one first geometry processing unit to produce a serial drawing element list; and a drawing unit operable to render said polygons of said combined display element list into a frame buffer.

10. The apparatus according to claim 9, wherein said controller is further operable to dynamically switch between said first and second modes of operation based on an aggregate geometry processing load among said geometry processing units such that processing speed is maximized.

11. The apparatus according to claim 9, wherein said controller is further operable to dynamically switch between said first and second modes of operation based on a change in a target said geometry processing units.

12. The apparatus according to claim 11, wherein said controller switches to said first mode of operation such that said at least one second geometry processing unit may calculate a representative point of an image object from among a plurality of vertexes, and switches to said second mode of operation thereafter.

13. The apparatus according to claim 10, wherein when said controller has selectively adopted said second mode of operation:

said at least one second geometry processing unit is further operable to perform said geometry processing to produce a coordinate conversion matrix that is capable of operating on vertexes of said polygons to produce moving objects of said moving image;

said at least one second geometry processing unit is further operable to transfer said coordinate conversion matrix to said at least one first geometry processing unit; and said at least one first geometry processing unit is further operable to apply said coordinate conversion matrix to said vertexes of said polygons to produce said serial drawing element list.

* * * * *

UNITED STATES PATENT AND TRADEMARK OFFICE
CERTIFICATE OF CORRECTION

PATENT NO.    : 6,559,854 B2
DATED         : May 6, 2003
INVENTOR(S)   : Masaaki Oka and Masakazu Suzuoki It is certified that error appears in the above-identified patent and that said Letters Patent is hereby corrected as shown below:

Column 8,
Line 31, "proforms a n" should read -- performs an --.
Line 32, "re" should read -- are --.

Column 9,
Line 15, "image-creation" should read -- image creation --.

Signed and Sealed this

Twelfth Day of August, 2003

JAMES E. ROGAN
*Director of the United States Patent and Trademark Office*